United States Patent
Hanssen

(10) Patent No.: US 9,256,399 B2
(45) Date of Patent: Feb. 9, 2016

(54) BREAKING PROGRAM EXECUTION ON EVENTS

(71) Applicant: Atmel Corporation, San Jose, CA (US)

(72) Inventor: Ingar Hanssen, Tiller (NO)

(73) Assignee: Atmel Corporation, San Jose, CA (US)

( * ) Notice: Subject to any disclaimer, the term of this patent is extended or adjusted under 35 U.S.C. 154(b) by 183 days.

(21) Appl. No.: 13/929,554

(22) Filed: Jun. 27, 2013

(65) Prior Publication Data

US 2015/0006965 A1  Jan. 1, 2015

(51) Int. Cl.
*G06F 11/00* (2006.01)
*G06F 9/44* (2006.01)
*G06F 11/36* (2006.01)
*G06F 11/34* (2006.01)
*G06F 13/00* (2006.01)
*G06F 9/48* (2006.01)

(52) U.S. Cl.
CPC ................ *G06F 8/00* (2013.01); *G06F 9/4812* (2013.01); *G06F 11/3466* (2013.01); *G06F 11/3636* (2013.01); *G06F 11/3664* (2013.01); *G06F 13/00* (2013.01)

(58) Field of Classification Search
CPC .............. G06F 11/3624; G06F 11/362; G06F 11/3089; G06F 11/3656; G06F 11/36; G06F 11/3466; G06F 11/3636
See application file for complete search history.

(56) References Cited

U.S. PATENT DOCUMENTS

| | | | |
|---|---|---|---|
| 5,896,524 A | 4/1999 | Halstead et al. | |
| 6,018,809 A | 1/2000 | Garrett | |
| 6,026,501 A * | 2/2000 | Hohl et al. | 714/38.13 |
| 6,047,124 A | 4/2000 | Marsland | |
| 6,145,100 A | 11/2000 | Madduri | |
| 6,345,295 B1 | 2/2002 | Beardsley et al. | |
| 6,732,307 B1 | 5/2004 | Edwards | |
| 6,802,031 B2 | 10/2004 | Floyd et al. | |
| 6,912,673 B1 | 6/2005 | Wyland | |
| 6,920,586 B1 * | 7/2005 | Moyer | 714/43 |
| 7,043,668 B1 | 5/2006 | Treue et al. | |
| 7,076,767 B1 * | 7/2006 | Williams | 717/127 |
| 7,231,339 B1 * | 6/2007 | Nemecek et al. | 703/28 |
| 7,330,809 B2 | 2/2008 | Tabe | |
| 7,464,301 B1 | 12/2008 | Entezari et al. | |
| 7,490,271 B2 | 2/2009 | Higashida et al. | |
| 7,712,084 B2 * | 5/2010 | Beuten et al. | 717/129 |
| 8,407,528 B2 | 3/2013 | Larson | |
| 8,499,201 B1 | 7/2013 | Chiu et al. | |
| 2002/0026544 A1 | 2/2002 | Miura | |

(Continued)

OTHER PUBLICATIONS

Non-final rejection for U.S. Appl. No. 13/929,605, amiled Jun. 18, 2015, 25 pages.

(Continued)

*Primary Examiner* — Yolanda L Wilson
(74) *Attorney, Agent, or Firm* — Fish & Richardson P.C.

(57) ABSTRACT

Systems and methods for breaking program execution on events are described. One of the systems includes an event subsystem for receiving the signaling events generated by one or more associated peripheral devices. The system also includes a command module which is coupled between the event subsystem and a debug module, the command module receives the signaling events from the event subsystem and in response generates break commands. The debug module of the system receives the break commands from the command module and, in response, interrupts the execution of a program of a controller.

14 Claims, 5 Drawing Sheets

(56) References Cited

U.S. PATENT DOCUMENTS

| | | |
|---|---|---|
| 2002/0188831 A1 | 12/2002 | Jackson et al. |
| 2002/0194401 A1 | 12/2002 | Sakugawa |
| 2004/0199823 A1 | 10/2004 | Dodson et al. |
| 2005/0033553 A1 | 2/2005 | Swaine et al. |
| 2005/0193277 A1 | 9/2005 | Horikawa et al. |
| 2007/0074081 A1 | 3/2007 | DeWitt et al. |
| 2008/0133838 A1* | 6/2008 | Higuchi et al. ............... 711/125 |
| 2010/0077143 A1 | 3/2010 | Reid et al. |
| 2010/0107143 A1 | 4/2010 | Emberling |
| 2011/0219376 A1 | 9/2011 | Williams et al. |
| 2011/0320745 A1* | 12/2011 | Zhang et al. ................. 711/154 |
| 2013/0159780 A1 | 6/2013 | Bedwell et al. |
| 2013/0254596 A1 | 9/2013 | Eder et al. |
| 2015/0006969 A1 | 1/2015 | Hanssen |
| 2015/0006970 A1 | 1/2015 | Hanssen |

OTHER PUBLICATIONS

Non-final rejection for U.S. Appl. No. 13/929,617, mailed May 4, 2015, 17 pages.

NN9012465 "Monitoring of Computer Systems Input/Output Bus Functions", Dec. 1, 1990, IBM Technical Disclosure Bulletin, vol. 33, lss. 7, pp. 465-467.

U.S. Final Office Action in U.S. Appl. No. 13/929,617, dated Aug. 18, 2015, 18 pages.

* cited by examiner

BREAKING PROGRAM EXECUTION ON EVENTS

TECHNICAL FIELD

This disclosure relates generally to electronics including controllers.

BACKGROUND

Microcontrollers can be used for controlling other devices. Examples of devices controlled by microcontrollers are analog to digital converters, digital to analog converters, input and output ports, DMA controllers, and memories. A microcontroller may provide an interface for breaking the program execution and debugging a program running thereon.

The devices that are controlled by microcontrollers send and receive information in the form of a number of signaling events. The signaling events inform the microcontroller and/or the other devices of such events like changing the state of a specific device. A device can respond to a signaling event received from other devices or the microcontroller and perform a corresponding action.

Increasing the number of devices in a system can increase the number of signaling events that occur. In some architectures, an event system can be provided that includes multiplexers that rout the signaling events among the devices as well as the microcontroller.

SUMMARY

In one aspect, a controller system includes an event subsystem that receives signaling events generated by one or more associated peripheral devices; a command module coupled between the event subsystem and a debug module, the command module receiving the signaling events from the event subsystem and generating break commands responsive thereto; and the debug module for receiving the break commands from the command module and, in response, interrupting execution of a program of the controller.

In another aspect, a method includes receiving signaling events for one or more peripheral devices associated with a controller; providing the received signaling events to a command module for triggering one or more actions in the controller responsive to the signaling events; sampling the received signaling events including identifying one or more unmasked signaling events; and generating interrupts in the controller in response to changes of the unmasked signaling events.

Implementations may include one or more of the following features. The command module of the controller system may include a latch module that samples the received signaling events and may include a mask module that determines one or more unmasked signaling events. Identifying one or more unmasked signaling events includes receiving mask data, the mask data identifying zero or more signaling events, comparing the received signaling events with the mask data and determining the unmasked signaling events as the received signaling events that do no match with any one of the signaling events identified by the mask data. The command module may include a detection module that detects changes of the unmasked signaling events and generates the break commands.

Generating interrupts in the controller may include single stepping the unmasked signaling events. The single stepping may include interrupting the execution of the controller, triggering one or more actions in the controller responsive to a change of an unmasked signaling event, and returning to a normal operation mode of the controller after executing the one or more actions.

A change of an unmasked signaling event may include setting or resetting the unmasked signaling event. Generating a break command by the command module can occur in response to a change of a single unmasked signaling event or in response to a change of a combination of unmasked signaling events. The controller system can become a part of an integrated circuit incorporated in a chip. The event subsystem may include one or more multiplexers that route the signaling events to the command module.

A triggered action in the controller in response to a change of an unmasked signaling event may reset the controller. Generating an interrupt in the controller may occur in response to a change of a single unmasked signaling event or in response to a combination of unmasked signaling events.

Aspects of the invention may implement none, one or more of the following advantages. Proposed systems and methods connect the event system to the debug system so as to enable an understanding of how the event system influences the program execution and also validate whether the event system is correctly configured.

The details of one or more implementations are set forth in the accompanying drawings and the description below. Other aspects, features, and advantages will be apparent from the description and drawings, and from the claims.

DETAILED DESCRIPTION

Microcontrollers can be used for controlling one or more other devices (as will be referred to hereafter as, the peripheral devices). Peripheral devices may receive commands from an associated microcontroller in a device. An event system can be included in the device that enables direct peripheral-to-peripheral communication and signaling. The event system can allow/control a change of state in one peripheral device to automatically trigger actions in other peripheral devices. The event system can also allow autonomous control and interaction of the peripheral devices without the use of resources such as a system CPU (that generates interrupts) or DMA controller, therefore reducing the complexity, size, and execution time of a program running on the microcontroller.

A change of state in a peripheral device may be referred to as a signaling event and may correspond to an interrupt condition in a peripheral device. The signaling events can directly pass to other peripheral devices using an event routing network. Additionally, signaling events can also be generated by a program running on the microcontroller.

It may be difficult to debug the behavior of an event system running in parallel with the program execution of the microcontroller. Being able to validate a signaling event has/has not occurred at the correct instance or determining a signaling event has/has not triggered a correct action is valuable for analyzing the event system. Exposing the inner signaling events to a debugger that is configured to debug the program execution of the microcontroller, provides a great tool that makes it possible to validate that the event system is correctly configured.

Figure 1:
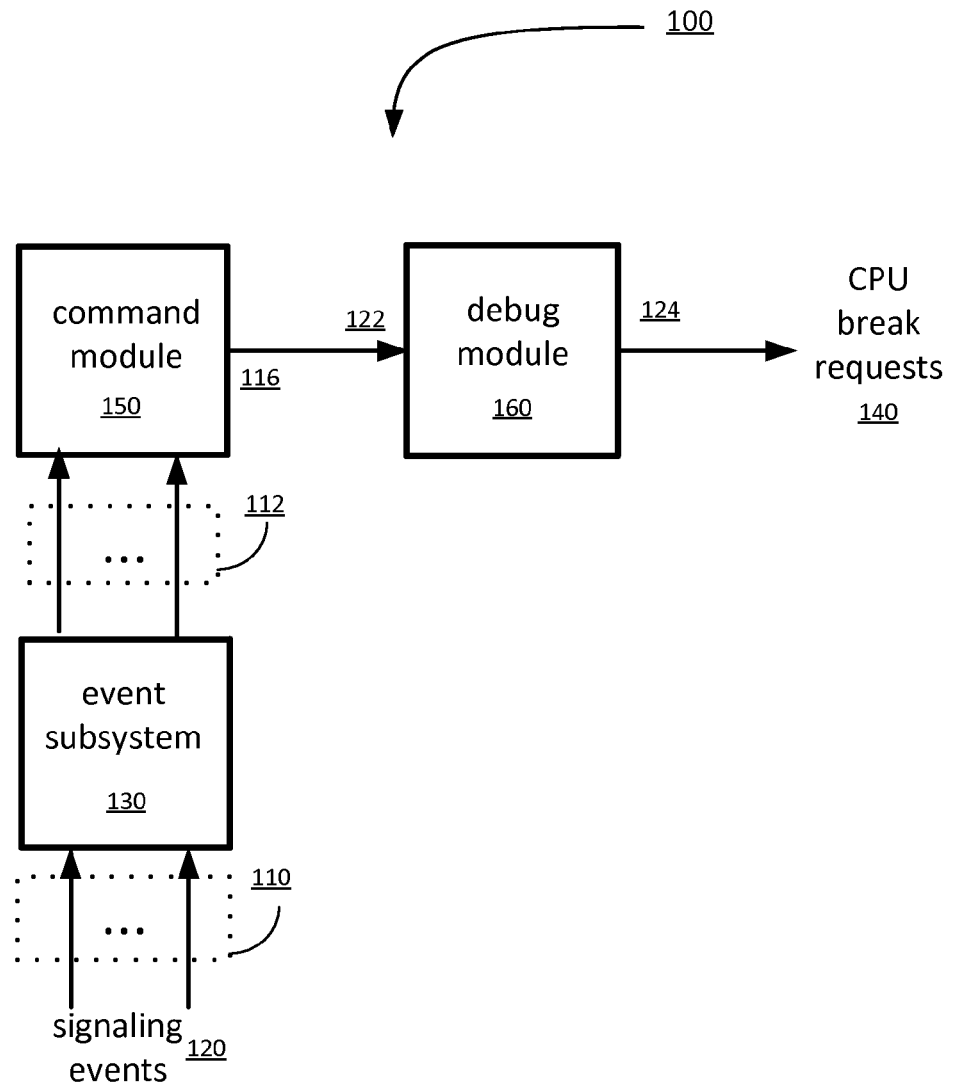
FIG. 1 is a diagram of an example controller.

Referring to FIG. 1, an example of a controller 100 is shown that includes an event subsystem 130 which receives a number of signaling events 120. The event subsystem 130 receives the signaling events 120 through different input ports 110 and provides the signaling events 120 through the event channels 112 to a command module 150. Based on the received signaling events 120, the command module 150 generates break commands and delivers the commands through the output port 116 to a debug module 160. The command module 150 is described below with respect to FIG. 2. The debug module 160 receives the break commands through the input port 122 and generates CPU break requests 140 through the output port 124.

The event subsystem 130 receives the signaling events 120 for peripheral devices and routes the signaling events through event channels among peripheral devices. An example of an event subsystem 130 is the subsystem 600 shown in FIG. 6. The event subsystem 130 may use multiplexers for routing the event sources to event users. The signaling events can be used by event consumers (the devices that are monitoring the events) for triggering one or more actions in response to a signaling event. There may be routing latency in the event subsystem 130 from when a signaling event is received/generated until the time the event actions in other peripherals are triggered.

In some implementations, the controller 100 can be implemented as an integrated circuit on a microcontroller chip. In a configuration implemented on a microcontroller chip, the output 140 of the circuit 100 can be routed to an on-chip debug system of the microcontroller.

Figure 2:
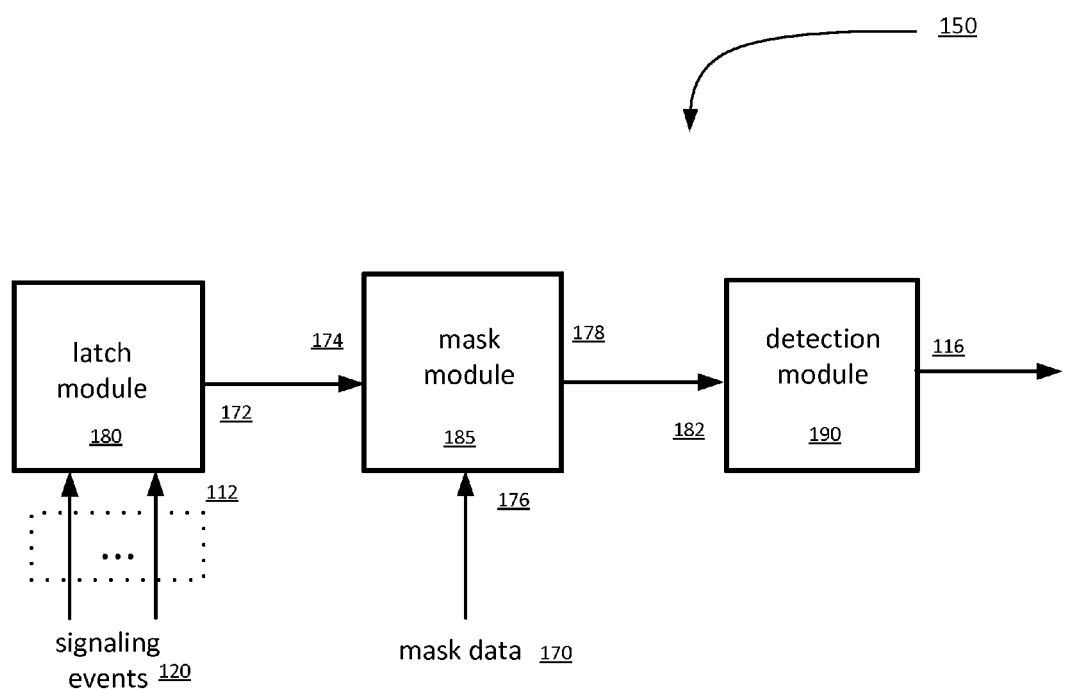
FIG. 2 is a diagram of an example command module.

FIG. 2 illustrates an example of a command module 150. The command module 150 includes a latch module 180. The latch module 180 receives the signaling events 120 through the event channels 112. The latch module 180 samples and holds the signaling events passing through the event channels 112. The latch module 180 transfers the sampled signaling events through the output port 172 to a mask module 185.

The mask module 185 receives the sampled signaling events through the input port 174. The mask module 185 also receives the mask data 170 through the input port 176. The mask data indicates the signaling events that may be masked. The masked signaling events are ones that are not traced/monitored and can be discarded. Based on the received mask data, mask module 185 can inhibit the signaling events that are not being monitored or traced from passing to the output port 178. Only the signaling events that are not masked, i.e., the unmasked signaling events, may pass to output port 178 of the mask module. In some implementations, the mask module 185 may mask low priority signaling events. In some implementations, the mask module 185 may not mask any signaling event.

The detection module 190 receives the unmasked signaling events through the input port 182. When a change of an unmasked signaling event is detected by the detection module 190 a break command can be generated and provided on the output port 116. The detection module 190 can generate a break command in response to the change of each unmasked signaling event. In some implementations, the detection module 190 can generate the break command in response to a change of a combination of one or more unmasked signaling events occurring substantially simultaneously, in a sequence, or in a given time period. An example of a change of a signaling event includes a setting and/or resetting (clearing) of the signaling event.

In some implementations, the latch module 180, the mask module 185, and the detection module 190 can be combined into a single command module that samples the received signaling event, identifies the unmasked signaling events, and generates break commands in response to detecting changes of one or more or a sequence of unmasked signaling events.

Figure 3:
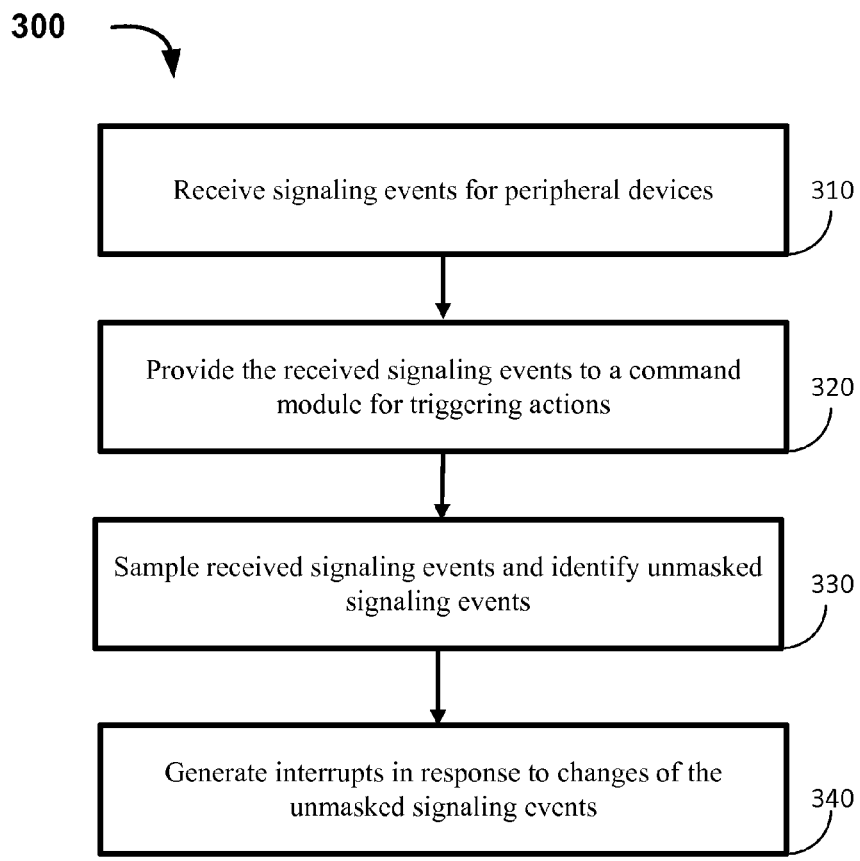
FIG. 3 is a flow diagram of an example method for driving a controller.

Referring to FIG. 3 a flow diagram of an example method 300 is shown. The method 300 can be executed by the system 100 of FIG. 1. The method includes receiving signaling events associated with peripheral devices (310). Each peripheral device can generate one or more signaling events in response to a condition such as a change in their state. The signaling events can be received by the event subsystem 130 shown in FIG. 1. The signaling events of the peripheral devices can be generated in parallel and therefore the signaling events that are transferred to the event subsystem may simultaneously be available.

Figure 6:
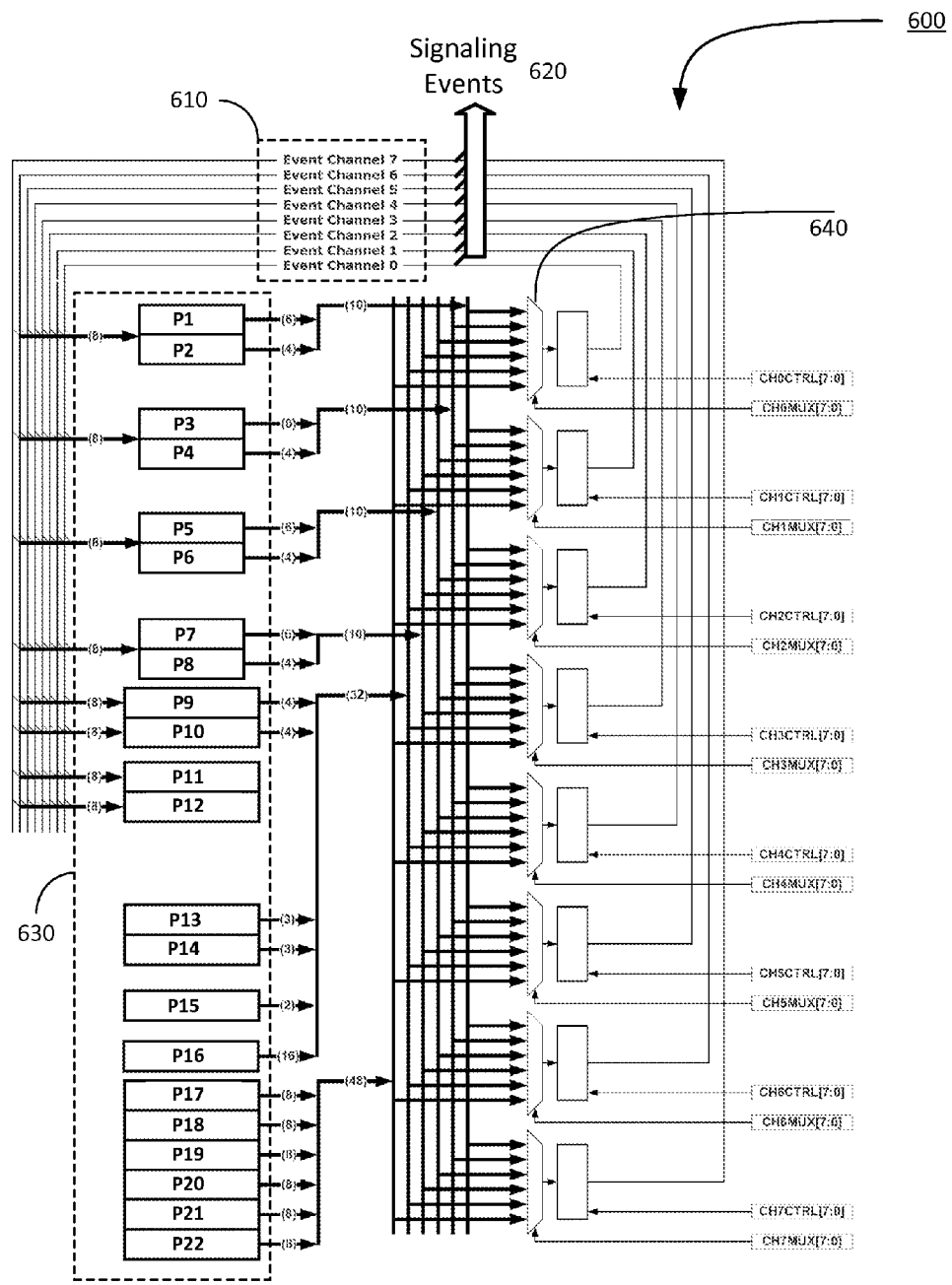
FIG. 6 is a diagram of an example event subsystem.

The signaling events are provided, for example, to a command module for triggering actions (320). The event subsystem 130, transfers the signaling events on event channels. An example event channel 610 is shown in FIG. 6. The command module can monitor the event channels and receive one or more signaling events based on the monitoring.

The received signaling events are sampled and unmasked signaling events are identified (330). As an example, the sampling of the signaling events is performed by a latch module 180. The routing of the signaling events among peripheral devices may not be affected by the sampling of the signaling events. The signaling events can last a few clock cycles and the sampling time period can be set to ensure signaling events are not lost. A portion of the steps (e.g., performed in command module 150) for triggering actions are described with respect to FIG. 4 wherein a group of the received and sampled signaling events may be selected for monitoring/actions and the rest can be discarded. As an example, mask module 185 can filter out masked received signaling events and only the unmasked signaling events are transferred. In some implementations, asynchronous sampling using edge detectors can be used.

Program execution is interrupted in response to changes of unmasked signaling events (340). In some implementations, when at least a change of one of the unmasked signaling events is detected a break command can be generated to interrupt the program execution. In some implementations, the detection of the unmasked signaling events may occur in the detection module 190 wherein upon a detection of the change of an unmasked signaling event, a break command can be generated and the break command may cause the debug module 160 to interrupt the program execution of the microcontroller. As an example, when the program is halted, the debug module 160 may provide the content of the registers and one or more memories or the event system status.

Figure 4:
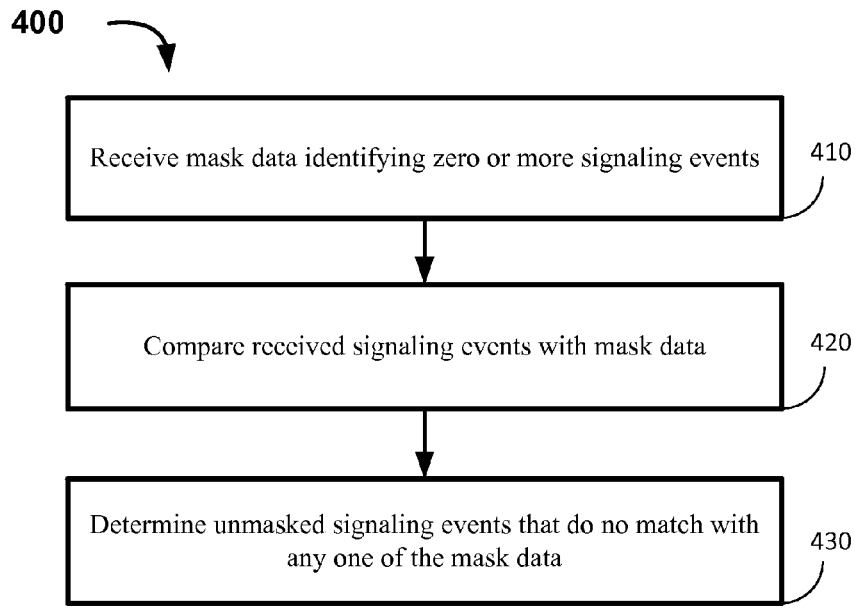
FIG. 4 is a flow diagram of an example method for determining unmasked signaling events.

Referring to FIG. 4, the flow diagram of a method 400 is shown. The method 400, for example, can be performed in the mask module 185 of the command module 150. The method includes receiving mask data that identifies zero or more signaling events (410). The signaling events identified by the mask data are the ones that are not selected for tracing and may be ignored. The program execution in not interrupted when these signaling events occur.

The received signaling events are compared with the mask data (420). For example, mask module 185 can be configured to receive all signaling events. The mask data indicates which signaling events may be ignored. Comparing the received signaling events with the signaling events designated by the mask data and finding the matches enable the identification of which singling events are to be ignored/discarded.

The signaling events that do not match with the signaling events in the mask data are determined as unmasked signaling events (430). The unmasked signaling events are the ones that can trigger a break command.

Figure 5:
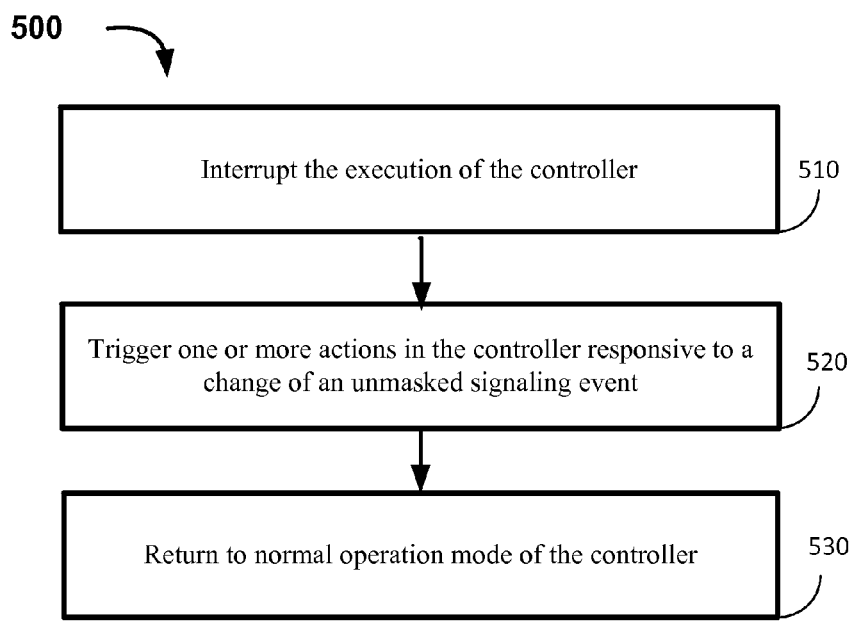
FIG. 5 is a flow diagram of an example method for single stepping the signaling events.

Referring to FIG. 5, the flow diagram of a method 500 is shown. As an example, the method 500 can be performed on system 100 of FIG. 1 and provide a single stepping of the unmasked signaling events. Receiving a break command interrupts the execution of the controller (510). The controller can be arranged to treat a CPU break request from the debugger as an interrupt condition which may cause an interrupt routine to be executed when a CPU break is received. In some implementations, the executed interrupt routine may stop a clock associated with a given peripheral device, preventing the peripheral device from generating more signaling events.

The interrupt triggers one or more actions (520). In response to receiving changes of the unmasked signaling events, break commands can be generated, the program execution halted and one or more actions triggered. As an example and as shown in FIG. 2, the unmasked signaling events are provided by the mask module 185 and the break commands are generated by the detection module 190. The triggered action can include a simple stopping of the execution of the microcontroller program for a predetermined amount of time or writing some data to a memory.

The controller returns to normal operation mode at 530. After executing the triggered action of the previous step the controller continues the normal operation. The method 500 provides the single stepping of the events. By receiving the change of an unmasked event, the program execution of the microcontroller halts, one or more actions are optionally executed, and the program execution continues its course.

Referring to FIG. 6, an example of a subsystem 600 for routing the signaling events is displayed. The subsystem 600 includes 22 peripheral devices 630 and 8 multiplexers 640 for routing the signaling events in parallel through 8 event channels 610. By providing access to the parallel event channels 610, the signaling events 620 can be delivered as outputs.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A controller system comprising:
   an event subsystem that receives signaling events generated by associated peripheral devices, wherein the event subsystem is configured to route the signaling events to allow or control a change of state in one peripheral device to automatically trigger an action on another peripheral device;
   a command module coupled between the event subsystem and a debug module, the command module receiving the signaling events from the event subsystem and generating break commands responsive thereto; and
   the debug module for receiving the break commands from the command module and, in response, interrupting execution of a program of the controller.

2. The system of claim 1, the command module further comprising:
   a latch module that samples the received signaling events;
   a mask module that
      receives mask data, the mask data identifies zero or more signaling events,
      compares the received signaling events with the mask data,
      determines unmasked signaling events as the received signaling events that do not match with any one of the signaling events identified by the mask data; and
   a detection module that detects changes of the unmasked signaling events and generates the break commands.

3. The system of claim 2, wherein a change of an unmasked signaling event includes setting or resetting a signaling event.

4. The system of claim 2, wherein generating a break command by the command module is in response to a change of a single unmasked signaling event.

5. The system of claim 2, wherein generating a break command by the command module is in response to a change of a combination of unmasked signaling events.

6. The system of claim 1, wherein the controller system is a part of an integrated circuit incorporated in a chip.

7. The system of claim 1, wherein the event subsystem includes one or more multiplexers that route the signaling events to the command module.

8. A method comprising
   receiving, from an event subsystem, signaling events for peripheral devices associated with a controller, wherein the event subsystem is configured to route the signaling events to allow or control a change of state in one peripheral device to automatically trigger an action on another peripheral device;
   providing the received signaling events to a command module for triggering one or more actions in the controller responsive to the signaling events;
   sampling the received signaling events including identifying one or more unmasked signaling events; and
   generating interrupts in the controller in response to changes of the unmasked signaling events.

9. The method of claim 8, wherein identifying one or more unmasked signaling events comprises:
   receiving mask data, the mask data identifying zero or more signaling events;
   comparing the received signaling events with the mask data; and
   determining the unmasked signaling events as the received signaling events that do not match with any one of the signaling events identified by the mask data.

10. The method of claim 8, wherein a change of an unmasked signaling event includes setting or resetting a signaling event.

11. The method of claim 8, wherein generating an interrupt in the controller further includes single stepping the unmasked signaling events, the single stepping comprising:
   interrupting the execution of the controller;
   triggering one or more actions in the controller responsive to a change of an unmasked signaling event; and
   returning to a normal operation mode of the controller after executing the one or more actions.

12. The method of claim 11, wherein an action resets the controller.

13. The method of claim 9, wherein generating an interrupt in the controller is in response to a change of a single unmasked signaling event.

14. The method of claim 9, wherein generating an interrupt in the controller is in response to a change of a combination of unmasked signaling events.

* * * * *